US010013014B2

(12) United States Patent
Patoka

(10) Patent No.: US 10,013,014 B2
(45) Date of Patent: Jul. 3, 2018

(54) STABILIZATION SYSTEM AND METHOD FOR INPUT OSCILLATION

(71) Applicant: TEXAS INSTRUMENTS INCORPORATED, Dallas, TX (US)

(72) Inventor: Martin H. Patoka, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 66 days.

(21) Appl. No.: 13/726,688

(22) Filed: Dec. 26, 2012

(65) Prior Publication Data

US 2013/0214755 A1    Aug. 22, 2013

Related U.S. Application Data

(60) Provisional application No. 61/600,386, filed on Feb. 17, 2012.

(51) Int. Cl.
*G05F 5/00* (2006.01)
*H02M 1/32* (2007.01)
*H02M 1/36* (2007.01)
*H02M 3/156* (2006.01)

(52) U.S. Cl.
CPC ............... *G05F 5/00* (2013.01); *H02M 1/32* (2013.01); *H02M 1/36* (2013.01); *H02M 3/156* (2013.01)

(58) Field of Classification Search
CPC ............... H02M 3/156; H02M 3/1588; H02M 2001/0009; H02M 2001/0032; Y02B 70/1466
See application file for complete search history.

(56) References Cited

U.S. PATENT DOCUMENTS

| | | | | |
|---|---|---|---|---|
| 5,982,645 A | * | 11/1999 | Levran et al. | 363/37 |
| 6,184,667 B1 | * | 2/2001 | Lacey | H02M 3/1563 323/282 |
| 7,292,019 B1 | * | 11/2007 | Fernald | 323/354 |
| 8,278,997 B1 | * | 10/2012 | Kim et al. | 327/541 |
| 2006/0274557 A1 | * | 12/2006 | Ball et al. | 363/19 |
| 2007/0279024 A1 | * | 12/2007 | Falvey | H02M 3/158 323/280 |
| 2008/0175026 A1 | * | 7/2008 | Yang | 363/21.15 |
| 2011/0310646 A1 | * | 12/2011 | Humphrey | H02M 3/1584 363/126 |
| 2012/0026766 A1 | * | 2/2012 | Adragna | 363/84 |
| 2012/0274390 A1 | * | 11/2012 | Chen et al. | 327/519 |

* cited by examiner

*Primary Examiner* — Nguyen Tran
*Assistant Examiner* — Monica Mata
(74) *Attorney, Agent, or Firm* — Tuenlap D. Chan; Charles A. Brill; Frank D. Cimino

(57) ABSTRACT

A system and method for controlling power supply input filter oscillations is provided. The method includes utilizing a converter power circuit to generate a positive input resistance to counteract input filter oscillations, which are generated in response to normal converter negative input impedance and current-mode control operation. A controller controls the converter power circuit to generate the positive resistance utilizing a first input corresponding to the voltage applied to the converter input. A second input disables the converter power circuit based on completion of output capacitor charge, the first and second inputs being different.

17 Claims, 5 Drawing Sheets

STABILIZATION SYSTEM AND METHOD FOR INPUT OSCILLATION

CROSS-REFERENCE TO RELATED APPLICATION

This application claims the benefit of U.S. Provisional Patent Application 61/600,386 filed on Feb. 17, 2012, entitled STABILIZATION METHOD FOR INPUT FILTER OSCILLATIONS USING CURRENT MODE CONTROL, the entirety of which is incorporated by reference herein.

TECHNICAL FIELD

This disclosure relates to a system and method to provide input filter oscillation stabilization for power converters.

BACKGROUND

Voltage converters such as DC-DC converters come in two forms. When an input voltage is to be stepped up in voltage by the converter, a boost or step-up configuration is provided. When the input voltage needs to be stepped down to a lower voltage by the converter, a buck converter is provided. Thus, a buck converter is a step-down DC-DC converter. Its design is similar to the step-up boost converter, and like the boost converter, it can be implemented as a switched-mode power supply that employs switches (e.g., a transistor and a diode), an inductor and a capacitor. Switched-mode power supplies can be efficient (95% or higher for integrated circuits), making them useful for tasks such as converting the main voltage in a telecom system (e.g., about −48 V) down to voltages needed by components such as a processor.

Most switched-mode power supplies require their power source's output impedance to be less than their respective input impedance (to frequencies above their loop crossover) for loop stability. There are classes of applications that are not able to meet this criterion due to system level considerations however. An example of this is a converter that must be hot-pluggable, which limits the permissible input capacitance to protect the input connector of the converter. Rather large, and potentially damaging, voltage and current oscillations between the converter switching elements and the input filtering can result from failing the stability criteria.

SUMMARY

This disclosure relates to a system and method to provide input stabilization for power converters.

In one example, an apparatus includes a converter power circuit to generate a positive resistance to counteract a transient, such as a large inrush current, generated in response to a voltage applied to a load capacitance. A controller controls the converter power circuit to counteract the transient based on a first input corresponding to the voltage applied to the converter power circuit and to disable the converter power circuit based on a second input after the transient has completed, the first and second inputs being different.

In another example, a method includes monitoring a first input to determine if a voltage has been applied to a load capacitance. The method includes monitoring a first input to determine if a voltage has been applied. The method includes enabling a converter power circuit based on the monitoring of the first input to mitigate a transient generated by the applied voltage to the load capacitance. The method includes monitoring a second input to determine if the transient is complete. This includes disabling the converter power circuit after the transient is complete.

In yet another example, an apparatus includes a first input to sense an input voltage that has been applied to a system. A converter power circuit can be employed to mitigate a transient generated in response to the applied voltage to a load capacitance. A controller enables the converter power circuit based on the input voltage received at the first input and disables the converter power circuit after the load capacitance is charged as detected at a second input to the controller.

DETAILED DESCRIPTION

Figure 1:
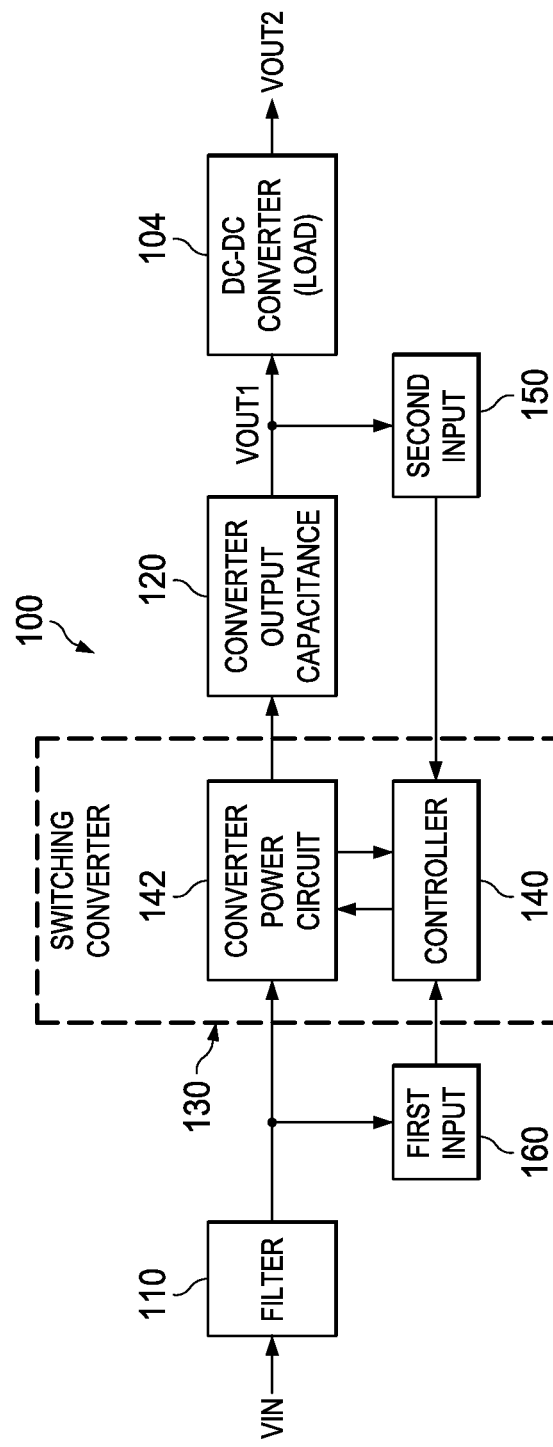
FIG. 1 illustrates an example of a system for controlling input inrush current transients to a hot-pluggable DC-DC Converter.

FIG. 1 illustrates an example of a system 100 for controlling input oscillation to a DC-DC Converter 104. The system 100 provides an active circuit to control inrush, surge, and fault currents to downstream circuits such as DC-DC converters 104. For example, the system 100 enables the DC-DC converter 104 to be hot-plugged into a power source while mitigating the impacts of increasing voltage and current oscillations that may result from such operation. As used herein, the term transient can refer to a voltage and/or current transient such as due to oscillations between converter switching elements and an input filter 110. Such transients can include transient signal clusters (e.g., oscillating waveforms) that occur in response to connecting the input to a live power supply (e.g., a hot swap event). In other examples, transients can include single events (e.g., voltage/current spike). In general, the system 100 employs a power converter (e.g., a DC-DC converter) to generate a counteracting resistance to the input transient for short period of time in order to mitigate such transient. Closed-loop or open-loop control methods can be applied as will be described in more detail below to mitigate the transient.

As shown, an input voltage VIN is applied to the filter 110 which begins to charge an output capacitance 120 through switching converter 130 operation, supplying an output voltage VOUT1 to a downstream circuit such as the DC-DC converter 104 which produces an output VOUT2. As the output capacitance 120 charges, the DC-DC converter 104 would normally exhibit a negative input resistance due to the pulse width modulation (PWM) action in conjunction with current-limited operation. One characteristic of negative input impedance is to decrease its average current in phase with the increasing applied voltage VIN. This characteristic causes the input filter 110 to resonate, generating high stresses which are potentially harmful to elements in the switching converter 130. To counteract these input filter 110 oscillations, it is desirable for the switching converter 130, to increase its average current in phase with the applied input which has the effect of generating a positive input impedance which further has the effect to mitigate transients associated with applying the voltage VIN to the filter 110 and load capacitance 120.

As shown, the switching converter 130 can include a controller 140 and converter power circuit 142 to generate the positive impedance. A first input 160 controls the switching converter 130 to generate the positive resistance to counteract the input filter 110 resonance. The controller 140 is further configured to disable the switching action of converter power circuit 142 based on a second input 150 after the output capacitor 120 has been charged.

In one example, the second input 150 can be a voltage divider that sets a threshold for controlling the disabling of the switching converter 130 via the controller 140. In another example, the second input 150 could be digital feedback such as could be read by a processor via analog to digital conversion (A/D), for example. In an example of open loop control, the controller 140 can employ a timer to disable the switching converter 130 after a predetermined length of time (e.g., the timer drives the second input). As shown, the first input 160 senses the voltage applied to the switching converter 130 input and the load capacitance 120. As will be shown and described below with respect to FIG. 4, the controller 140 (e.g., PWM controller) can be a clock, converter switch current sense (PWM) comparator, latch and switch gate driver. In one example, the AC-coupled voltage divider operating as the first input 160 is applied to a COMP input to the PWM comparator shown in FIG. 4. The second input 150 can operate a logic gate to enable or disable the switching converter 130 via the "en" input to the circuit of FIG. 4. In another example, the controller 140 can be a processor that controls the peak switch current, and detects the voltage applied to the load capacitance 120 and generates an output to enable or disable the converter power circuit 142.

After sensing that the startup inrush is complete, the controller 140 can disable the switching action of converter power circuit 142 connecting capacitance 120 to input filter 110 in a bypass mode of operation, wherein the voltage VOUT1 can then be used by a subsequent downstream circuit such as the DC-DC converter 104. The input filter 110 mitigates noise generated by the DC-DC converter 104 when the switching converter 130 is in bypass. As will be shown and described below with respect to FIG. 3, a transistor can be employed to bypass the converter power circuit 142 after the disabling of the switching converter 130.

As used herein, the term DC-DC converter 104 that receives VOUT1 is used to indicate that an input DC voltage supplied by VOUT1 of the system 100 is transformed to a subsequent DC voltage VOUT 2 (e.g., same or different). In one example, the DC-DC converter can be configured in a step-up voltage configuration between the DC input voltage and the respective DC output voltage of the converter (e.g., output voltage generated higher than input voltage). In another example, a step-down voltage configuration between the DC input voltage and the DC output voltage is possible (e.g., output voltage generated lower than input voltage). In yet another configuration, an isolation configuration is provided wherein the DC input voltage is substantially the same as the DC output voltage of the converter yet some form of isolation is provided between the input voltage and the output voltage of the converter such as through a transformer.

It is noted that the examples described herein can be provided via different analog and/or digital circuit implementations. For instance, in one example a resistor/capacitor filter could be employed, or in another example a switched capacitor filter could be employed. Similarly, in some examples, transconductance amplifiers may be employed and in other examples, voltage-controlled operational amplifiers can be employed. In some cases, field effect transistors can be employed and in other cases junction transistors or diodes employed. Some control components can be employed as discrete or integrated implementations, such as a comparator comparing a reference signal to a control signal and in other examples, controllers operating via processor instructions and exchanging data via D/A and A/D converters could be employed to monitor reference voltages and generate control signals within the system 100. All or portions of the various circuit examples described herein can be integrated on a common circuit such as in an integrated circuit.

In another example, the system 100 can be provided as an apparatus such that could be employed as a hotswap input protector to a downstream DC-DC converter 104 that receives VOUT1. The apparatus can include the first input 160 to sense that an input voltage that has been applied to the load capacitance 120. The apparatus can include the switching converter 130 to mitigate an inrush transient generated by the applied voltage to the load capacitance 120. The controller 140 can monitor the second input 160 to determine if the inrush transient is complete and disable the switching power supply 130 after the transient has been detected below the threshold voltage. The switching supply would become an effective short at the conclusion of the transient, connecting the output of filter 110 to VOUT1.

Figure 2:
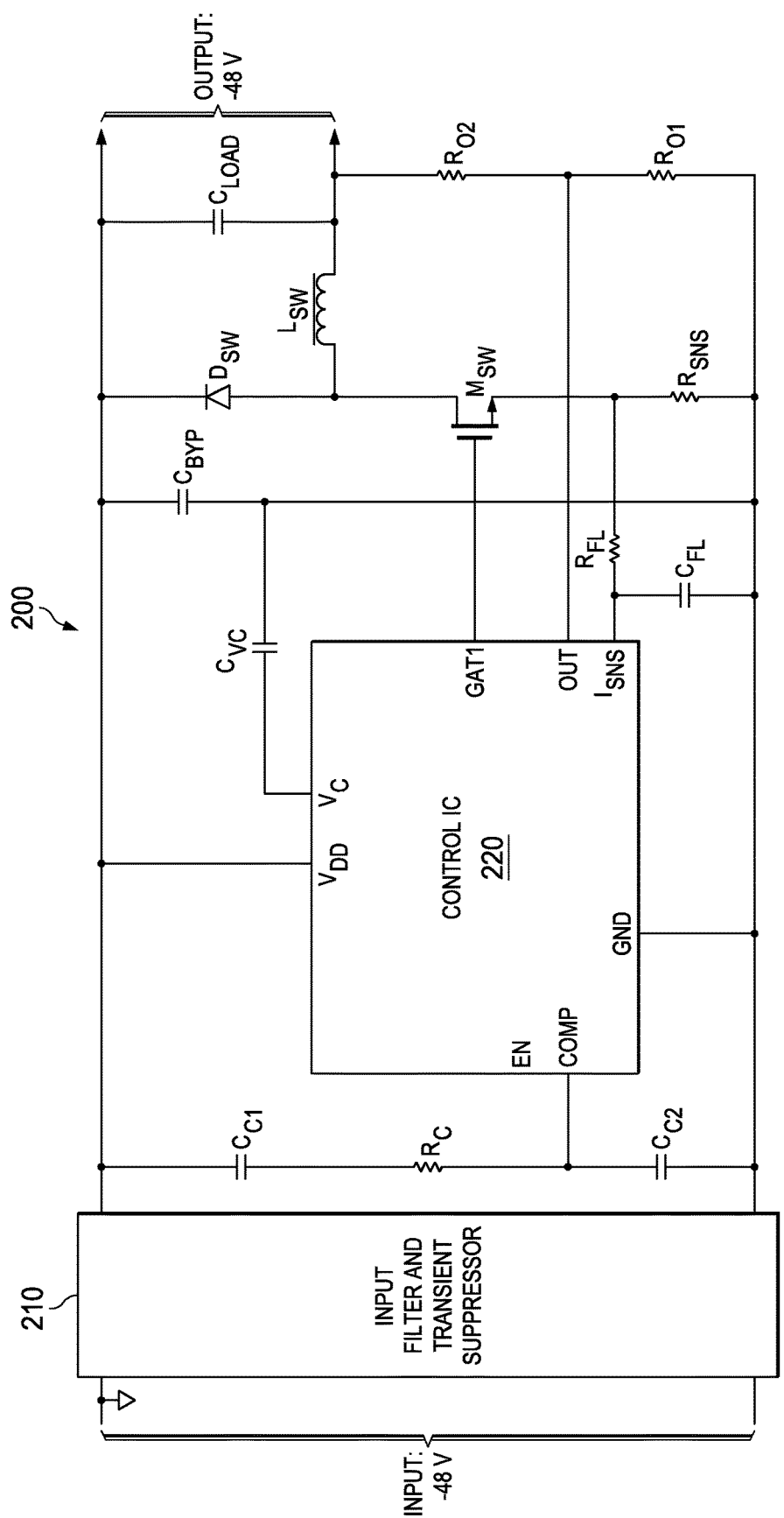
FIG. 2 illustrates an example system and filter for controlling input transients with input oscillations elimination.

FIG. 2 illustrates an example system 200 and filter 210 for controlling input inrush currents and oscillation. The input voltage is shown as −48 v however the polarity and voltage is arbitrary as positive voltages and voltages other than 48 v can be employed. A control IC senses the voltage at the output of the filter 210 via COMP input which is similar to the detector described above. An input filter/divider comprising CC1, CC2, and RC can be provided for the COMP input to perform the oscillation control functions of the first input 160 as discussed above, while the VDD input provides the dc voltage detection of first input 160. A GAT1 output from the control IC 220 controls a switch MSW which drives an inductor LSW and diode DSW, the combination of which form the switching power supply 130 described above. An OUT pin is an input to the control IC 220 employed to detect the voltage applied to load capacitance Cload via divider R01 and R02 as an implementation of the second input 150 as discussed above. The switch MSW would be ON when the converter is disabled as a result of input 150 meeting termination criteria (e.g., threshold condition). A sense input ISENSE (ISNS) is employed to sense current through the inductor LSW. Other filtering components can include CVC, CBYP, CFL, and RFL to filter inputs to the control IC 220.

To provide suitable input filtering, the input filter 210 corner and (resonance) frequency should be below the switching frequency. Thus, the filter output applies a current about equal to the averaged switching MOSFET current pulses. Increasing voltage to the switcher input at the control IC 220 increases the rate of current rise in the LSW, reducing the per-cycle ON time and the average current for a fixed peak current in LSW. The opposite occurs for decreasing input voltage. These loading changes with input voltage tend to emphasize any voltage perturbation on the output of filter 210, leading to a self-reinforcing oscillation. It is noted that this is a fundamental characteristic of switching converters and is the basis for their negative input impedance.

The system 200 addresses the problem of negative input impedance via summation of the input supply voltage (ac content) to the current-mode peak control via the COMP pin of IC 220. The AC input voltage is applied so as to counteract the normal tendency for shorter duty cycles as the input voltage rings upwards (increasing input). The amount of voltage fed back to the COMP pin of the IC 220 can be controlled to set the effective input resistance, resulting in a damping effect on the input filter 210.

Figure 4:
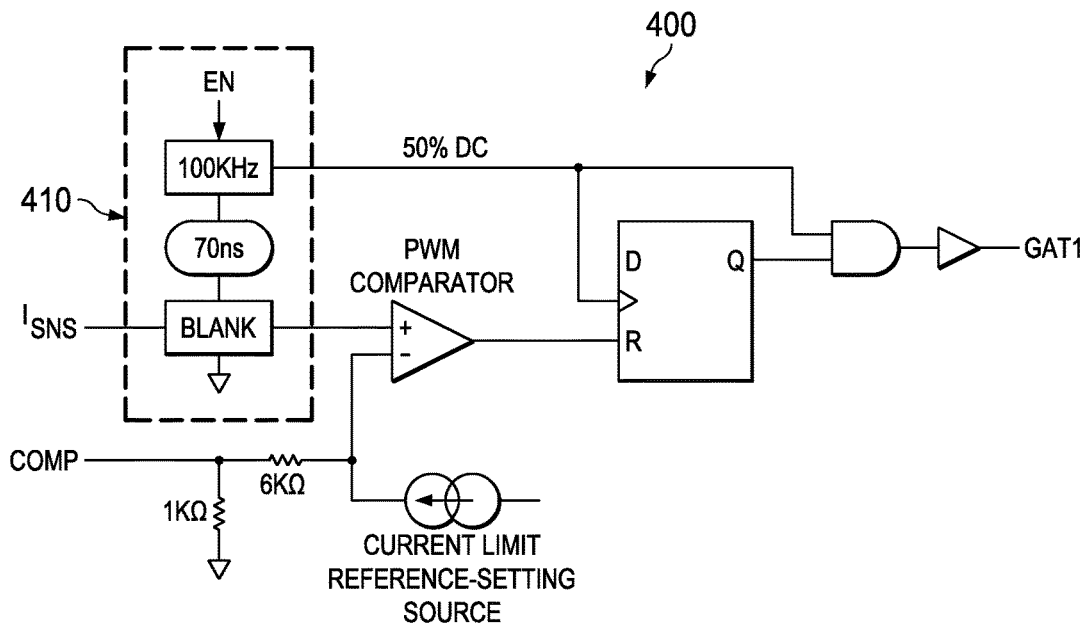
FIG. 4 illustrates an example PWM controller utilized when controlling input oscillation.

In circuit 200, the input voltage feedback occurs through the network CC1, RC, and CC2 which feed the input COMP of IC 220. This scaled input signal can be summed with a pulse width modulated PWM Comparator's reference as shown in FIG. 4. As the input voltage increases, the permitted peak current also increases, raising the averaged input current rather than decreasing it. Increasing current in phase with voltage is a characteristic of a positive-resistance input impedance. Resistance RO1 and RO2 are used to terminate switching action through the input labeled OUT. It is noted that this switching application does not require an outer, or voltage control loop.

Figure 3:
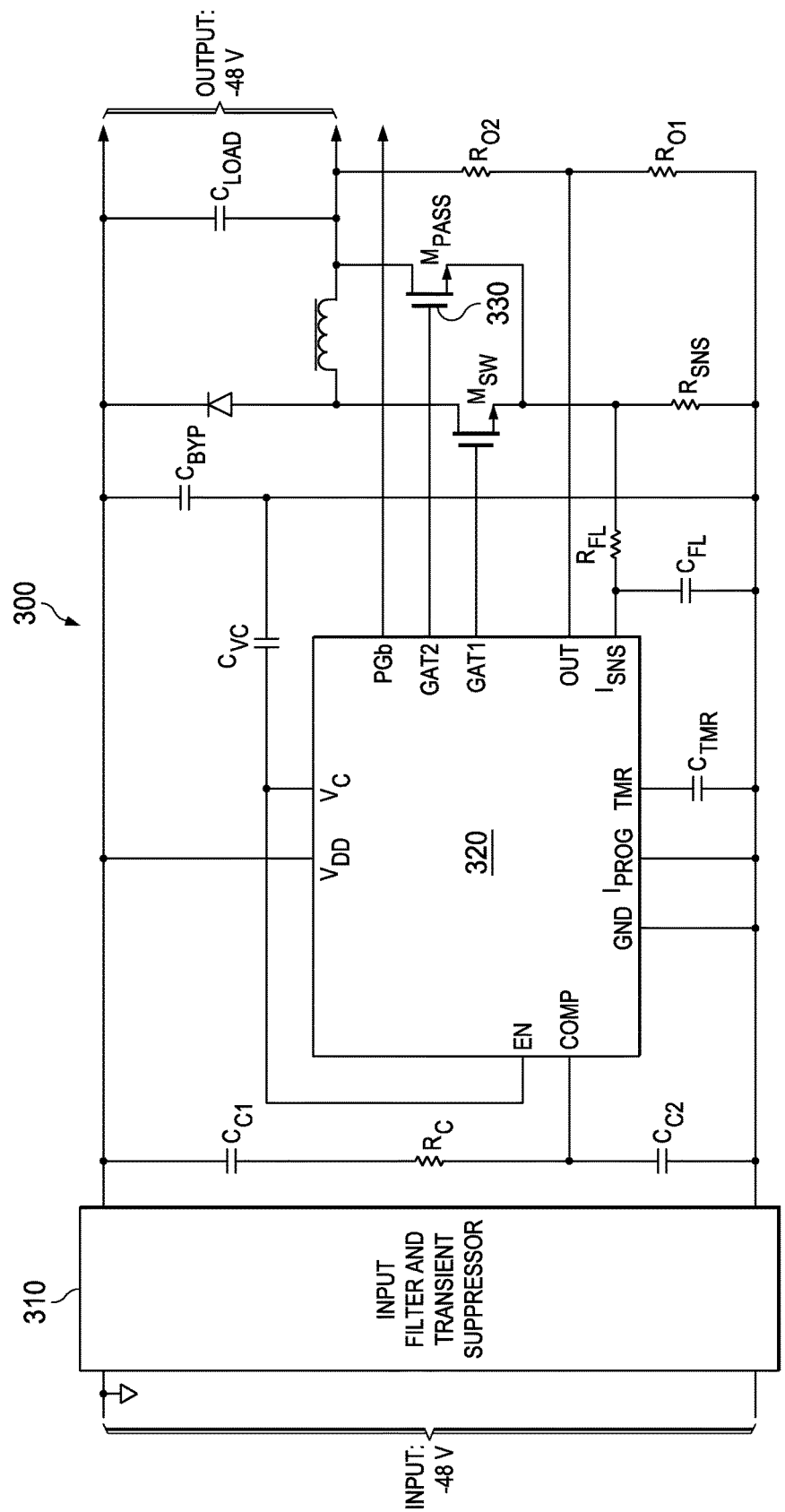
FIG. 3 illustrates an alternative example system and filter with provision for input oscillation control and distinct bypass.

FIG. 3 illustrates an alternative example system 300 and filter 310 for controlling input filter oscillation. In this example, a controller IC 320 includes an additional output GAT2 which controls a bypass switch 330 which is activated after the switcher described above with respect to FIG. 3 is disabled. The bypass switch 330 bypasses the switching elements LSW, DSW, and MSW while providing a path for Cload. In this case, the switcher device MSW is off in bypass. Output from Cload can be subsequently passed to a downstream circuit such as a DC-DC converter such as disclosed herein.

FIG. 4 illustrates and example controller 400 for controlling input oscillation. The controller 400 illustrates a discrete or integrated analog implementation for a controller described above in FIGS. 1-3. However, as previously noted, the controller 400 could be implemented as a processor employing A/D and D/A components to control the switching power supplies and mitigate the inrush transient as disclosed herein. The controller 400 can include a clock circuit 410 which controls a PWM comparator that drives switching logic to generate a GAT1 signal that drives a switching MOSFET (not shown) as previously described with respect to FIG. 2 and FIG. 3. As shown, an ISNS input and COMP input can be brought into the controller 400 to control GAT1 output timing and resultant enabling and disabling of the switching MOSFET MSW described above. An en input controls operation of the controller 400 GAT1 output as well.

Figure 5:
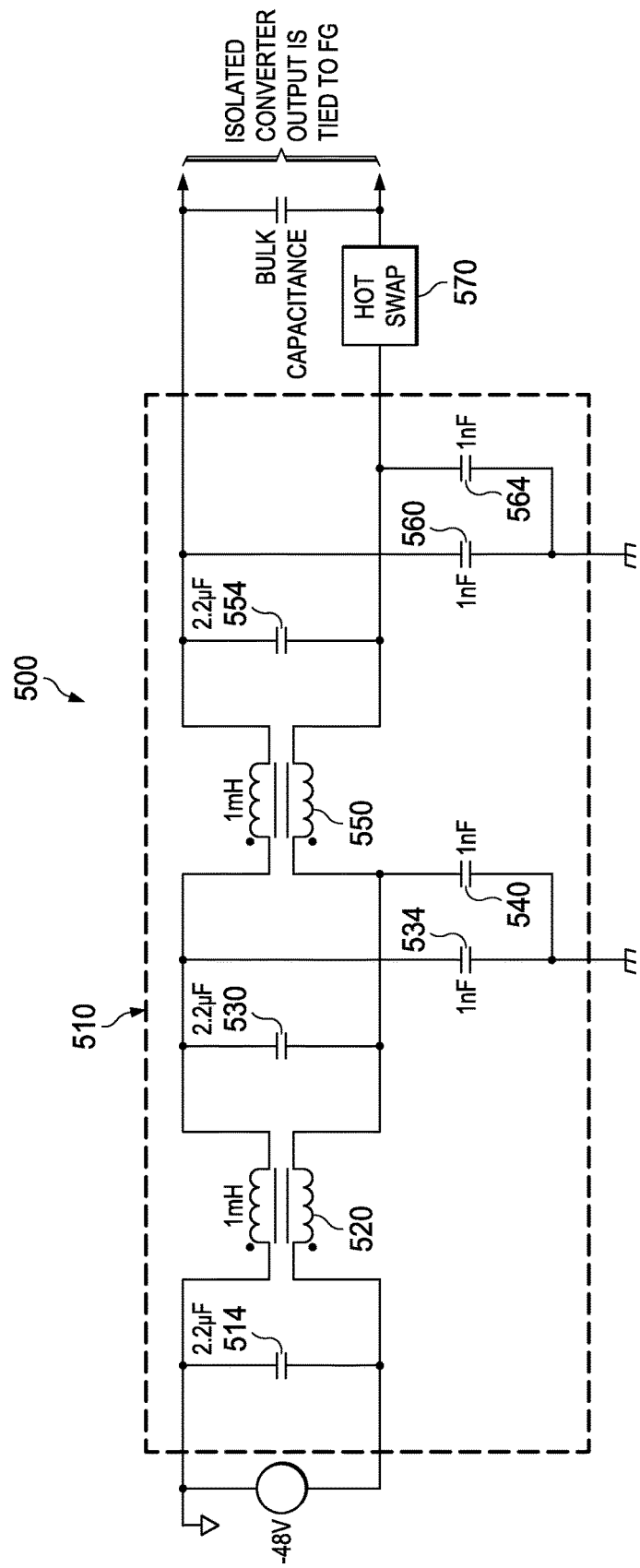
FIG. 5 illustrates and example filter for mitigating noise injected into a source.

FIG. 5 illustrates and example circuit 500 and filter 510 for mitigating input inrush transients and noise from downstream DC-DC converters. The filter depicted inside dashed line 510 is but one example of an input filter that can be employed with the controller and switching power supplies disclosed herein. The filter 510 operates in accordance with the controller and switching power supplies described above to further mitigate transients. In the example, of FIG. 5, the filter 510 can include a capacitor 514 and inductor 520. The filter 510 can include capacitors 530, 534, and 540 with inductor 550. The filter 510 can also include capacitors 554, 560, and 564, for example. Various combinations and values of capacitors, inductors, and/or resistors are possible other than the specific examples shown for performing such filtering. The circuit shown as Hot Swap 570 can include the combination of first and second inputs, controller, and switching power supply illustrated and described above with respect to FIG. 1. Output voltage from bulk capacitance (referred to as Cload in other examples disclosed herein) can be supplied to a downstream circuit such as corresponding to a stabilized voltage input to a DC-DC converter.

Figure 6:
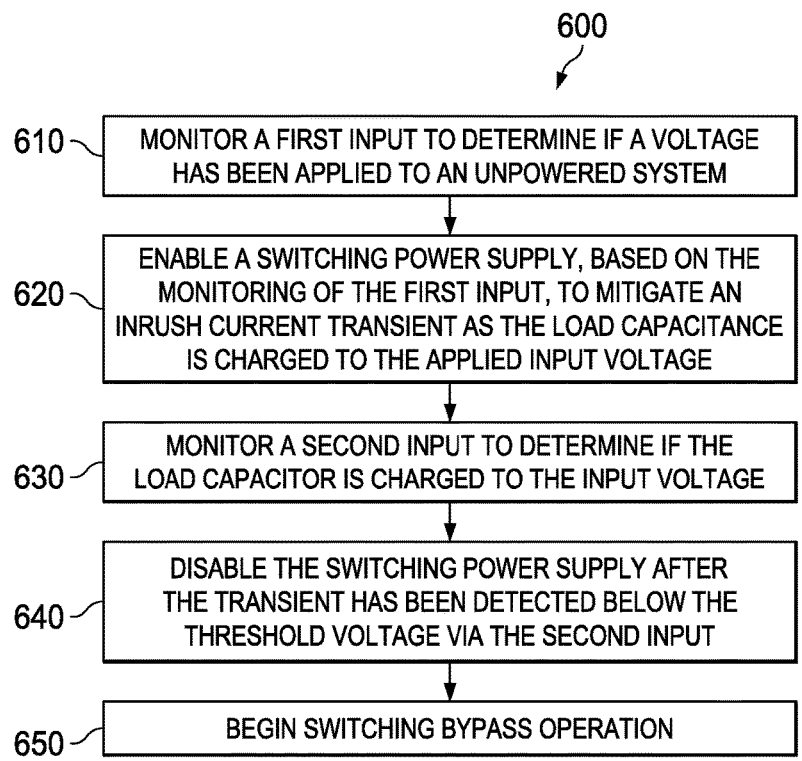
FIG. 6 illustrates an example method to mitigate an input inrush current transient and oscillation to a DC-DC converter.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 6 illustrates an example method 600 to mitigate input transients and filter oscillation to a DC-DC converter. At 610, the method 600 includes monitoring a first input to determine if a voltage has been applied to an unpowered system (e.g., via first input 160 of FIG. 1). At 620, the method 600 includes enabling a converter power circuit based on the monitoring of the first input to mitigate a transient (e.g., inrush current and oscillations in the input) as a load capacitance is charged to the applied input voltage (e.g., via operation of the controller 140 of FIG. 1). At 630, the method 600 includes monitoring a second input to determine if the load capacitance is charged to the applied input voltage (via second input 150 and controller 140 of FIG. 1). At 640, the method 600 includes disabling the converter power circuit after the transient has completed. At 650 the DC-DC converter is bypassed (e.g., see bypass circuit examples in FIG. 2 and FIG. 3).

In another example, the method 600 can include monitoring a digital signal to determine if the load capacitance is charged. This can include controlling a transistor circuit to enable and disable the switching power supply to stabilize the input voltage. In another aspect, the method 600 can include generating a control signal from a processor to enable and disable the switching power supply. This can include supplying the voltage applied to the load capacitance to a DC-DC converter What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:
1. An apparatus comprising:
a converter power circuit configured to deliver a charging current from a voltage source to charge a capacitive load; and a controller coupled to the converter power circuit, and configured to receive a first input and a second input, the controller configured to:
- establish a positive resistance across the voltage source while charging the capacitive load in response to the first input and
- disable and bypass the converter power circuit when the second input indicates that a voltage on the capacitive load reaches a predetermined amplitude and the charging current increases.

2. The apparatus of claim 1, wherein the second input is based on a sense voltage of the capacitive load, and the controller is configured to disable the converter power circuit based on the second input.

3. The apparatus of claim 2, wherein the sense voltage is received from a voltage divider coupled between the capacitive load and the voltage source.

4. The apparatus of claim 1, wherein the controller includes a timer coupled to the second input, so as to bypass the converter power circuit after a predetermined length of time.

5. The apparatus of claim 1, wherein the positive resistance is configured to counteract an oscillation generated in response to the capacitive load being charged.

6. The apparatus of claim 1, wherein the controller includes a comparator configured to compare a multiplied version of the first input with a voltage indicative of a current sensed from the converter power circuit.

7. The apparatus of claim 6, wherein the controller includes a logic gate to control a switching element in the converter power circuit, and the comparator has an output coupled to the logic gate.

8. The apparatus of claim 1, wherein the controller includes a processor configured to detect the first input and generates an output to the converter power circuit, the output includes the positive resistance to counteract a transient, and the output is configured to disable the converter power circuit after the transient is counteracted.

9. The apparatus of claim 1, further comprising:
an input filter configured to damp noise created by circuit components downstream of the capacitive load.

10. The apparatus of claim 1, further comprising:
- a first capacitor coupled to a first terminal of the voltage source;
- a resistor coupled between the first capacitor and the first input; and
- a second capacitor coupled between the first input and a second terminal of the voltage source,
- wherein the first capacitor, the resistor, and the second capacitor are coupled in series between the first and second terminals of the voltage source.

11. A method of operating a apparatus, comprising:
- monitoring a first input to detect a voltage from a voltage source;
- enabling a converter power circuit based on the monitoring of the first input to generate a positive resistance across the voltage source while charging a capacitive load, the positive resistance mitigating a transient generated by charging the capacitive load;
- monitoring a second input to detect an end of the transient and an increasing charging current; and
- disabling and bypassing the converter power circuit upon the end of the transient is detected.

12. The method of claim 11, further comprising:
monitoring, via the second input, a voltage received from a voltage divider coupled between the capacitive load and the power source.

13. The method of claim 11, wherein the first input or the second input are monitored as digital inputs to enable or disable the converter power circuit based on a threshold voltage.

14. The method of claim 13, further comprising:
generating a control signal from a processor to enable or disable the converter power circuit based on the threshold voltage.

15. The method of claim 11, further comprising:
deactivating a switching transistor during the bypassing.

16. The method of claim 11, further comprising:
supplying the voltage applied to the load capacitance to a second power converter.

17. The method of claim 11, further comprising:
activating a bypass transistor during the bypassing.

* * * * *